(12) United States Patent
Raichelgauz et al.

(10) Patent No.: US 8,880,566 B2
(45) Date of Patent: *Nov. 4, 2014

(54) ASSEMBLER AND METHOD THEREOF FOR GENERATING A COMPLEX SIGNATURE OF AN INPUT MULTIMEDIA DATA ELEMENT

(71) Applicant: Cortica, Ltd., Tirat Carmel (IL)

(72) Inventors: Igal Raichelgauz, Herzelia (IL); Karina Ordinaev, Haifa (IL); Yehoshua Y. Zeevi, Haifa (IL)

(73) Assignee: Cortica, Ltd., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,559

(22) Filed: Nov. 5, 2012

(65) Prior Publication Data

US 2013/0060773 A1    Mar. 7, 2013

Related U.S. Application Data

(63) Continuation of application No. 12/538,495, filed on Aug. 10, 2009, now Pat. No. 8,312,031, which is a continuation-in-part of application No. 12/084,150, filed as application No. PCT/IL2006/001235 on Oct. 26, 2006, now Pat. No. 8,655,801, said application No. 12/538,495 is a continuation-in-part of application No. 12/195,863, filed on Aug. 21, 2008, now Pat. No. 8,326,775, which is a continuation-in-part of application No. 12/084,150, said application No. 12/538,495 is a continuation-in-part of application No. 12/348,888, filed on Jan. 5, 2009.

(30) Foreign Application Priority Data

Oct. 26, 2005  (IL) .......................................... 171577
Jan. 29, 2006  (IL) .......................................... 173409
Aug. 21, 2007  (IL) .......................................... 185414

(51) Int. Cl.
*G06F 17/30* (2006.01)

(52) U.S. Cl.
CPC ..... *G06F 17/3002* (2013.01); *Y10S 707/99943* (2013.01); *Y10S 707/99948* (2013.01)
USPC .............. 707/803; 707/999.102; 707/999.107

(58) Field of Classification Search
None
See application file for complete search history.

(56) References Cited

U.S. PATENT DOCUMENTS 6,128,651 A    10/2000  Cezar
6,243,375 B1    6/2001  Speicher (Continued)

FOREIGN PATENT DOCUMENTS

WO    02/31764    4/2002
WO    2007/049282    5/2007

OTHER PUBLICATIONS

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.*

(Continued)

*Primary Examiner* — Anteneh Girma
(74) *Attorney, Agent, or Firm* — M&B IP Analysts, LLC

(57) ABSTRACT

An assembler for generating a complex signature of an input multimedia data element comprises a first interface for receiving a plurality of signatures respective of a plurality of minimum size multimedia data elements, wherein each of the plurality of the minimum size multimedia data elements is a minimal partition of the input multimedia data element; an assembly unit for combining the plurality of signatures respective of the plurality of minimum size multimedia data elements to generate the complex signature; and a second interface for storing at least the complex signature in a storage unit connected thereto.

20 Claims, 5 Drawing Sheets

(56) References Cited

U.S. PATENT DOCUMENTS

| | | | |
|---|---|---|---|
| 6,611,628 | B1 | 8/2003 | Sekiguchi et al. |
| 6,665,657 | B1 | 12/2003 | Dibachi |
| 6,751,613 | B1 | 6/2004 | Lee et al. |
| 6,754,435 | B2 | 6/2004 | Kim |
| 6,819,797 | B1 | 11/2004 | Smith et al. |
| 6,901,207 | B1 | 5/2005 | Watkins |
| 7,013,051 | B2 | 3/2006 | Sekiguchi et al. |
| 7,020,654 | B1 | 3/2006 | Najmi |
| 7,047,033 | B2 | 5/2006 | Wyler |
| 7,260,564 | B1 | 8/2007 | Lynn et al. |
| 7,302,117 | B2 | 11/2007 | Sekiguchi et al. |
| 7,313,805 | B1 | 12/2007 | Rosin et al. |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,376,722 | B1 | 5/2008 | Sim et al. |
| 7,433,895 | B2 | 10/2008 | Li et al. |
| 7,464,086 | B2 | 12/2008 | Black et al. |
| 7,536,417 | B2 | 5/2009 | Walsh et al. |
| 7,660,737 | B1 | 2/2010 | Lim et al. |
| 7,697,791 | B1 | 4/2010 | Chan et al. |
| 7,769,221 | B1 | 8/2010 | Shakes et al. |
| 7,788,132 | B2 | 8/2010 | Desikan et al. |
| 7,860,895 | B1 | 12/2010 | Scofield et al. |
| 7,904,503 | B2 | 3/2011 | Van De Sluis |
| 7,920,894 | B2 | 4/2011 | Wyler |
| 7,921,107 | B2 | 4/2011 | Chang et al. |
| 7,974,994 | B2 | 7/2011 | Li et al. |
| 7,987,194 | B1 | 7/2011 | Walker et al. |
| 7,991,715 | B2 | 8/2011 | Schiff et al. |
| 2003/0041047 | A1 | 2/2003 | Chang et al. |
| 2004/0153426 | A1 | 8/2004 | Nugent |
| 2005/0177372 | A1 | 8/2005 | Wang et al. |
| 2006/0253423 | A1 | 11/2006 | McLane et al. |
| 2007/0074147 | A1 | 3/2007 | Wold |
| 2007/0244902 | A1 | 10/2007 | Seide et al. |
| 2007/0253594 | A1 | 11/2007 | Lu et al. |
| 2008/0040277 | A1 | 2/2008 | DeWitt |
| 2008/0072256 | A1 | 3/2008 | Boicey et al. |
| 2008/0163288 | A1* | 7/2008 | Ghosal et al. .......... 725/31 |
| 2008/0201314 | A1 | 8/2008 | Smith et al. |
| 2008/0204706 | A1* | 8/2008 | Magne et al. .......... 356/32 |
| 2009/0089587 | A1 | 4/2009 | Brunk et al. |
| 2009/0125529 | A1 | 5/2009 | Vydiswaran et al. |
| 2009/0148045 | A1 | 6/2009 | Lee et al. |
| 2009/0204511 | A1 | 8/2009 | Tsang |
| 2009/0216639 | A1 | 8/2009 | Kapczynski et al. |
| 2009/0245603 | A1* | 10/2009 | Koruga et al. .......... 382/128 |
| 2010/0023400 | A1 | 1/2010 | Dewitt |
| 2010/0088321 | A1 | 4/2010 | Solomon et al. |
| 2010/0106857 | A1 | 4/2010 | Wyler |
| 2010/0191567 | A1 | 7/2010 | Lee et al. |
| 2011/0035289 | A1 | 2/2011 | King et al. |
| 2011/0106782 | A1 | 5/2011 | Ke et al. |
| 2011/0145068 | A1 | 6/2011 | King et al. |
| 2011/0202848 | A1 | 8/2011 | Ismalon |
| 2011/0208822 | A1 | 8/2011 | Rathod |

OTHER PUBLICATIONS

Foote, Jonathan et al., "Content-Based Retrieval of Music and Audio"; 1997, Institute of Systems Science, National University of Singapore, Singapore (Abstract).

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

IPO Examination Report under Section 18(3) for corresponding UK application No. GB1001219.3, dated May 30, 2012.

IPO Examination Report under Section 18(3) for corresponding UK application No. GB1001219.3, dated Sep. 12, 2011.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Maass, W. et al.: "Computational Models for Generic Cortical Microcircuits", Institute for Theoretical Computer Science, Technische Universitaet Graz, Graz, Austria, published Jun. 10, 2003.

International Search Report for the corresponding International Patent Application PCT/IL2006/001235; Date of Mailing: Nov. 2, 2008.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for International Patent Application No. PCT/US2008/073852; Date of Mailing: Jan. 28, 2009.

(56) References Cited

OTHER PUBLICATIONS

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

* cited by examiner

ASSEMBLER AND METHOD THEREOF FOR GENERATING A COMPLEX SIGNATURE OF AN INPUT MULTIMEDIA DATA ELEMENT

CROSS-REFERENCE TO RELATED APPLICATIONS

This application is a continuation of U.S. patent application Ser. No. 12/538,495 having a filing date of Aug. 10, 2009, now allowed, which is a continuation-in-part of:
(1) U.S. patent application Ser. No. 12/084,150 having a filing date of Apr. 7, 2009, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006;
(2) U.S. patent application Ser. No. 12/195,863, filed Aug. 21, 2008, now allowed, which claims priority under 35 USC 119 from Israeli Application No. 185414, filed on Aug. 21, 2007, and which is also a continuation-in-part of the above-referenced U.S. patent application Ser. No. 12/084,150; and
(3) U.S. patent application Ser. No. 12/348,888, filed Jan. 5, 2009, now pending. All of the applications referenced above are herein incorporated by reference.

TECHNICAL FIELD

The invention relates to search of multimedia content, and more specifically to generation of complex signatures to enable matches of multimedia content.

BACKGROUND

With the abundance of multimedia data made available through various means in general and the Internet and worldwide web (WWW) in particular, there is a need for effective ways of searching for, and management of, such multimedia data. Searching, organizing and management of multimedia data in general and video data in particular may be challenging at best due to the difficulty of representing and comparing the information embedded in the video content, and due to the scale of information that needs to be checked. Moreover, when it is necessary to find a content of video by means of a textual query, prior art cases revert to various metadata that textually describe the content of the multimedia data. However, such content may be abstract and complex by nature and not necessarily adequately defined by the existing and/or attached metadata.

The rapidly increasing multimedia databases, accessible for example through the Internet, call for the application of new methods of representation of information embedded in video content. Searching for multimedia in general and for video data in particular is challenging due to the huge amount of information that has to be priory indexed, classified and clustered. Moreover, prior art techniques revert to model-based methods to define and/or describe multimedia data. However, by its very nature, the structure of such multimedia data may be too abstract and/or complex to be adequately represented by means of metadata. The difficulty arises in cases where the target sought for multimedia data is not adequately defined in words, or by the respective metadata of the multimedia data. For example, it may be desirable to locate a car of a particular model in a large database of video clips or segments. In some cases the model of the car would be part of the metadata but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "the Architecture") that is based on a PCT patent application publication number WO 2007/049282 and published on May 3, 2007, entitled "A Computing Device, a System and a Method for Parallel Processing of Data Streams", assigned to common assignee, is hereby incorporated by reference for all the useful information it contains. Generally, the Architecture consists of a large ensemble of randomly, independently, generated, heterogeneous processing cores, mapping in parallel data-segments onto a high-dimensional space and generating compact signatures for classes of interest.

A vast amount of multimedia content exists today, whether available on the web or on private networks, having partial or full metadata that describes the content. When new content is added, it is a challenge to provide metadata that is accurate because of the plurality of metadata that may be potentially associated with a multimedia data element. Trying to do so manually is a tedious task and impractical in view of the amount of multimedia content being generated daily. Even more challenging is the matching between different multimedia content that represents the same, similar, or related concepts and/or information from different perspectives. For example, an image of the Washington Memorial in Washington D.C., may be taken from different angles, from different distances, in different lighting conditions, and at different positions of the camera, so that while in one photograph the Memorial is diagonal to the picture it is horizontal in another.

It would be therefore advantageous to provide a solution to overcome the limitations of the prior art described hereinabove.

SUMMARY

Certain embodiments of the invention include an assembler for generating a complex signature of an input multimedia data element. The assembler comprises a first interface for receiving a plurality of signatures respective of a plurality of minimum size multimedia data elements, wherein each of the plurality of the minimum size multimedia data elements is a minimal partition of the input multimedia data element; an assembly unit for combining the plurality of signatures respective of the plurality of minimum size multimedia data elements to generate the complex signature; and a second interface for storing at least the complex signature in a storage unit connected thereto.

Certain embodiments of the invention also include a method for generating a complex signature of an input multimedia data element. The method comprises receiving a plurality of signatures respective of a plurality of minimum size multimedia data elements, wherein each of the plurality of the minimum size multimedia data elements is a minimal partition of the input multimedia data element; combining the plurality of signatures respective of the plurality of minimum size multimedia data elements to generate the complex signature; and storing at least the complex signature in a storage unit connected thereto.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
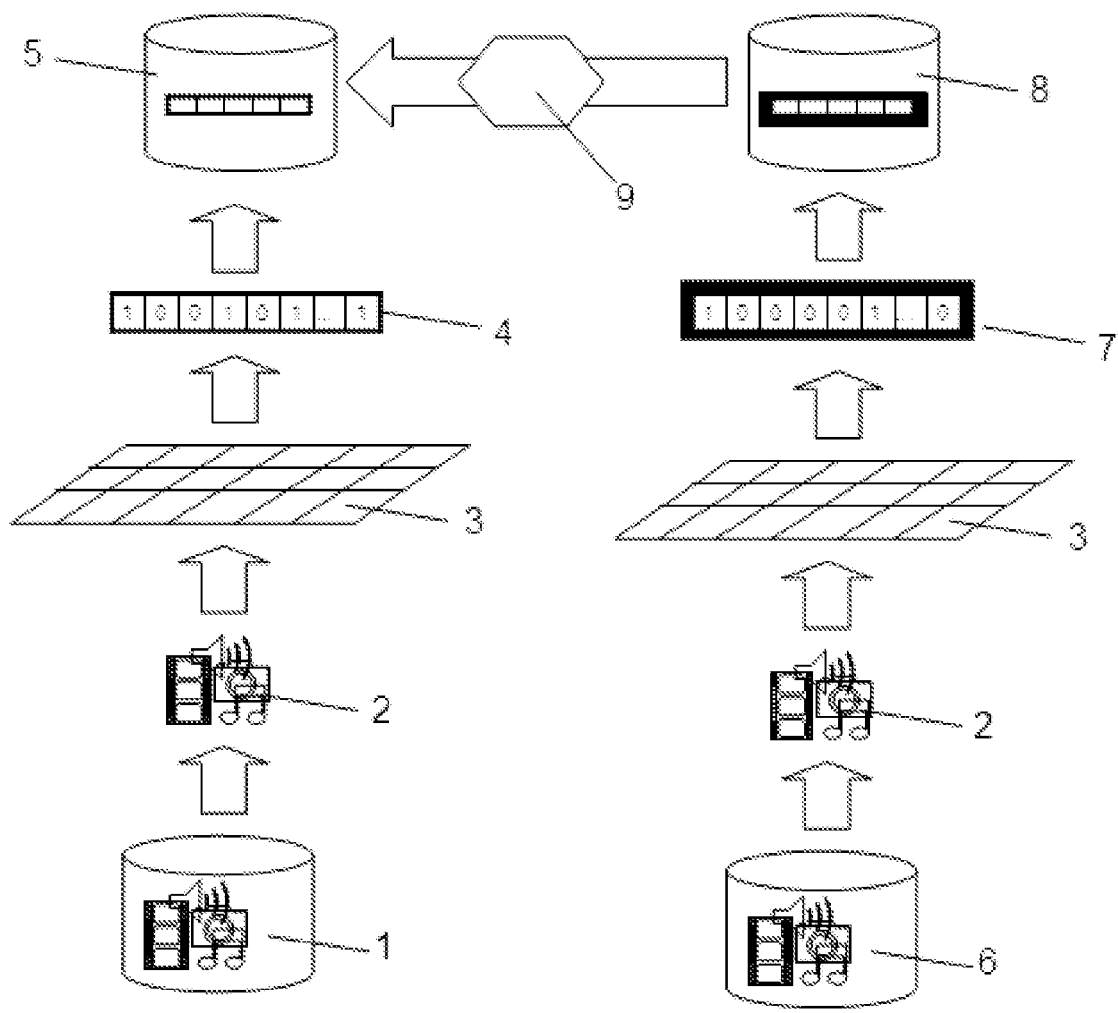
FIG. 1 is a block diagram depicting the basic flow of information in The System in large-scale video matching.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A method implemented according to an embodiment of the invention enables the association of metadata to a multimedia content based on finding matches to similar, partially-similar and/or related multimedia content. An input given multimedia content is matched to at least another multimedia content with corresponding metadata. Upon determination of a match, the corresponding metadata is processed and then used as metadata of the given multimedia content. When a large number of multimedia data is compared, a ranked list of metadata is provided. The most appropriate metadata is associated to the input given multimedia content based on various criteria. The method can be implemented in any applications which involve large-scale content-based clustering, recognition and classification of multimedia data, such as, content-tracking, video filtering, multimedia taxonomy generation, video fingerprinting, speech-to-text, audio classification, object recognition, video search and any other application requiring content-based signatures generation and matching for large content volumes such as, web and other large-scale databases.

Certain embodiments of the invention include a framework, a method, and a system, and their technological implementations and embodiments, for large-scale matching-based multimedia Deep Content Classification (DCC). In accordance with an embodiment of the invention the system is based on the Architecture which is an implementation of a computational architecture described in patent application publication number WO 2007/049282. As mentioned above, the Architecture consists of a large ensemble of randomly, independently, generated, heterogeneous processing computational cores, mapping in parallel data-segments onto a high-dimensional space and generating compact signatures for classes of interest.

In accordance with the principles of the invention, a realization of The Architecture embedded in large-scale video matching system (hereinafter "the Matching System") for multimedia DCC is disclosed. The Architecture receives an input stream of multimedia content segments, injected in parallel to all computational cores. The computational cores generate compact signatures of a specific content segment, and/or of a certain class of equivalence and interest of content-segments. For large-scale volumes of data, the signatures are stored in a conventional way in a database of size N, allowing match between the generated signatures of a certain content-segment and the signatures stored in the database, and accomplishing it with a low-cost, in terms of complexity, i.e. $\leq O(\log N)$, and response time.

An embodiment of the Matching System used for the purpose of explaining the principles of the invention therein is now demonstrated. Other embodiments are described in the co-pending patent applications of which this patent application is a continuation-in-part of, and are incorporated herein by reference. Moreover, it is appreciated that other embodiments will be apparent to one of ordinary skill in the art.

Characteristics and advantages of the Matching System include but are not limited to: the Matching System is flat and generates signatures at an extremely high throughput rate; the Matching System generates robust natural signatures, invariant to various distortions of the signal; the Matching System is highly-scalable in high-volume signatures generation; the Matching System is highly scalable in matching against large volumes of signatures; the Matching System generates Robust Signatures for exact match with low cost, in terms of complexity and response time; the Matching System accuracy is scalable versus the number of computational cores, with no degradation effect on the throughput rate of processing; the throughput of the Matching System is scalable with the number of computational threads, and is scalable with the platform for computational cores implementation, such as FPGA, ASIC, etc.; and, the Robust Signatures produced by the Matching System are task-independent, thus the process of classification, recognition and clustering can be done independently from the process of signatures generation, in the superior space of the generated signatures.

The goal of the Matching System is to effectively find matches between members of a large scale Master Database (DB) of video content-segments and a large scale Target DB of video content-segments. The match between two video content segments should be invariant to a certain set of statistical distortions performed independently on two relevant content-segments. Moreover, the process of matching between a certain content-segment from the Master DB to the Target DB consisting of N segments, cannot be done by matching directly from the Master content-segment to all N Target content-segments, for large-scale N, since the corresponding complexity of O(N), will lead to a non-practical response time. Thus, the representation of content-segments by both Robust Signatures and Signatures is crucial application-wise. The Matching System embodies a specific realization of the Architecture for large scale video matching purposes.

A high-level description of the process for large scale video matching performed by the Matching System is depicted in FIG. 1. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 2. Referring back to FIG. 1, at the final step, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the invention, that the signatures are based on a single frame, leading to certain simplification of the computational cores generation. The Matching System is extensible for signatures generation capturing the dynamics in-between the frames and the information of the frame's patches.

Figure 2:
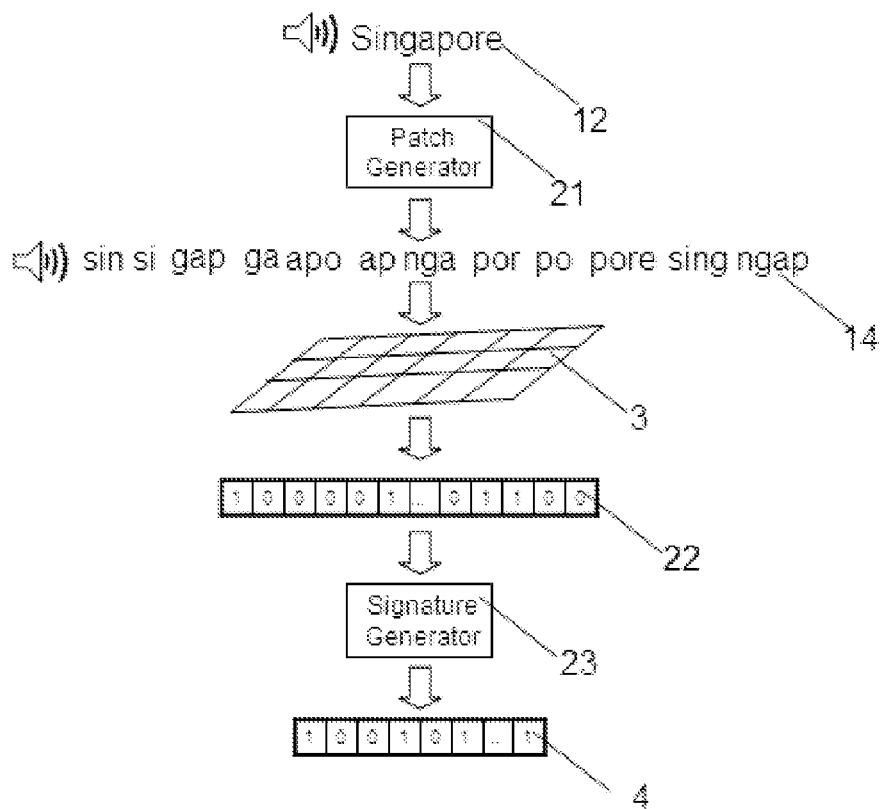
FIG. 2 is a diagram showing the flow of patches generation, response vector generation, and signature generation in a Large-Scale Speech-to-Text System implemented in accordance with certain embodiments of the invention.

The signatures generation process will now be described with reference to FIG. 2. The first step in the process of signatures generation from a given speech-segment is to break-down the speech-segment to K patches 14 of random length P and random position within the speech segment 12. The break-down is performed by the patch generator component 21. The value of K and the other two parameters are determined based on optimization, considering the tradeoff between accuracy rate and the number of fast matches required in the flow process of the System. In the next step, all the K patches are injected in parallel to all L computational Cores 3 to generate K response vectors 22. The vectors 22 are fed into the signature generator 23 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The Cores generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node ni equations are:

$$V_i = \sum_j w_{ij} k_j$$

$n_i = \theta_i(V_i - Th_x)$; $\theta$ is a Heaviside step function; $w_{ij}$ is a coupling node unit (CNU) between node i and image component j (for example, grayscale value of a certain pixel j); $k_i$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

I: For: $V_i > Th_{RS}$ $$1 - p(V > Th_S) - 1 - (1-\epsilon)^l \ll 1$$

i.e., given that I nodes (cores) constitute a Robust Signature of a certain image I, the probability that not all of these I nodes will belong to the Signature of same, but noisy image, is sufficiently low (according to a system's specified accuracy).

II: $p(V_i > Th_{RS}) \approx l/L$ i.e., approximately 1 out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison of the original data. Detailed description of the signature generation process can be found in the co-pending patent applications of which this patent application is a continuation-in-part, and are hereby incorporated by reference.

Computational Core generation is a process of definition, selection and tuning of the Architecture parameters for a certain realization in a specific system and application. The process is based on several design considerations, such as:

(a) The Cores should be designed so as to obtain maximal independence, i.e. the projection from a signal space should generate a maximal pair-wise distance between any two cores' projections into a high-dimensional space.

(b) The Cores should be optimally designed for the type of signals, i.e. the Cores should be maximally sensitive to the spatio-temporal structure of the injected signal, for example, and in particular, sensitive to local correlations in time and space. Thus, in some cases a core represents a dynamic system, such as state in space, phase space, edge of chaos, etc., which is uniquely used herein to exploit their maximal computational power.

(c) The Cores should be optimally designed with regard to invariance to a set of signal distortions, of interest in relevant applications.

A system and method for generating complex signatures for a multimedia data element (MMDE) based on signatures of minimum size multimedia data elements are now discussed. Accordingly a partitioning unit partitions the multimedia data content into minimum size multimedia data elements and selects a reduced set of MMDEs, based on generic low-level characteristics of MMDEs. A signature generator generates signatures for each of the selected minimum size multimedia data elements. An assembler unit assembles a complex signature for a higher level partition multimedia data element by assembling respective complex signatures or signatures of minimum size multimedia data elements of an immediately lower partition level. Multimedia data elements include, but are not limited to, images, graphics, video streams, video clips, audio streams, audio clips, video frames, photographs, images of signals, combinations thereof, and portions thereof. This process generates a hologram-like relationship within the complex-signature set of signatures, i.e., each signature contains some information of the complete set of multimedia data elements. While the original signature represents some local information about relevant multimedia data elements, the complex signature structure enables distributed representation of the information of the entire set of multimedia data elements.

Figure 3:
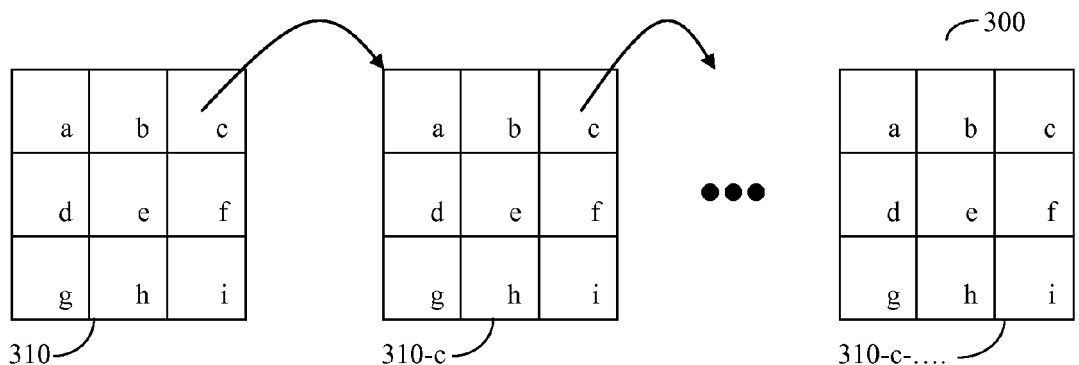
FIG. 3 is a diagram illustrating the generation of complex signatures in accordance with the principles of the invention.

According to certain embodiments of the invention complex signatures, for example but without limitations, signatures as described hereinabove, are generated for the multimedia data elements. FIG. 3 shows an exemplary and non-limiting diagram illustrating the generation of such complex signatures. For the purpose of the discussion, but by no means of limitations or loss of generality, an image 310 is partitioned into a plurality of portions 310-a through 310-i. An element 310-c may then be further partitioned to elements 310-c-a, 310-*c*-*b*, . . . , 310-*c*-*i*. This of course may continue until an element 310-*c*-*c*- . . . -*c* is determined to be sufficiently small, for example by determining a threshold after which no additional partition takes place. It should be noted that in the description hereinabove each portion was divided into the same number of sub-portions as the other portion, and specifically the higher level portion; however, this is not required in order to achieve the benefits of the invention. In fact, the number of sub-portions may differ from this example, and may further differ at each stage or portion. For each of these minimum size multimedia data elements a signature is then generated. The signatures may be generated based on the principles discussed hereinabove, however, other techniques for generating such signatures may be used without departing from the scope of the invention.

A complex signature is a signature which is a combination of lower level signatures. In the exemplary case the signature of the multimedia element 310 is therefore the following combination: S310={S310-*a*, S310-*b*, . . . S310-*i*}. Each of the signatures S310-*a* through S310-*i* is also a complex signature of lower level signatures, for example, the signature S310-*c* is a complex signature that is a combination of: S310-*c*={S310-*c*-*a*, S310-*c*-*b*, . . . S310-*c*-*i*}. As explained above this may continue such that a signature S310-*c*-*b* may be a complex signature of lower level signatures. In one embodiment, at least the lowest level multimedia data elements have signatures respective of at least four angular permutations of the element, i.e., rotated by 0°, rotated by 90°, rotated by 180° and rotated by 270°. While degrees of permutations are shown herein, other permutations may be used depending on the type of the multimedia data element. The rationale for having such image permutations is to enable a better matching between multimedia data elements. The matching process is explained in detail herein below.

Figure 4:
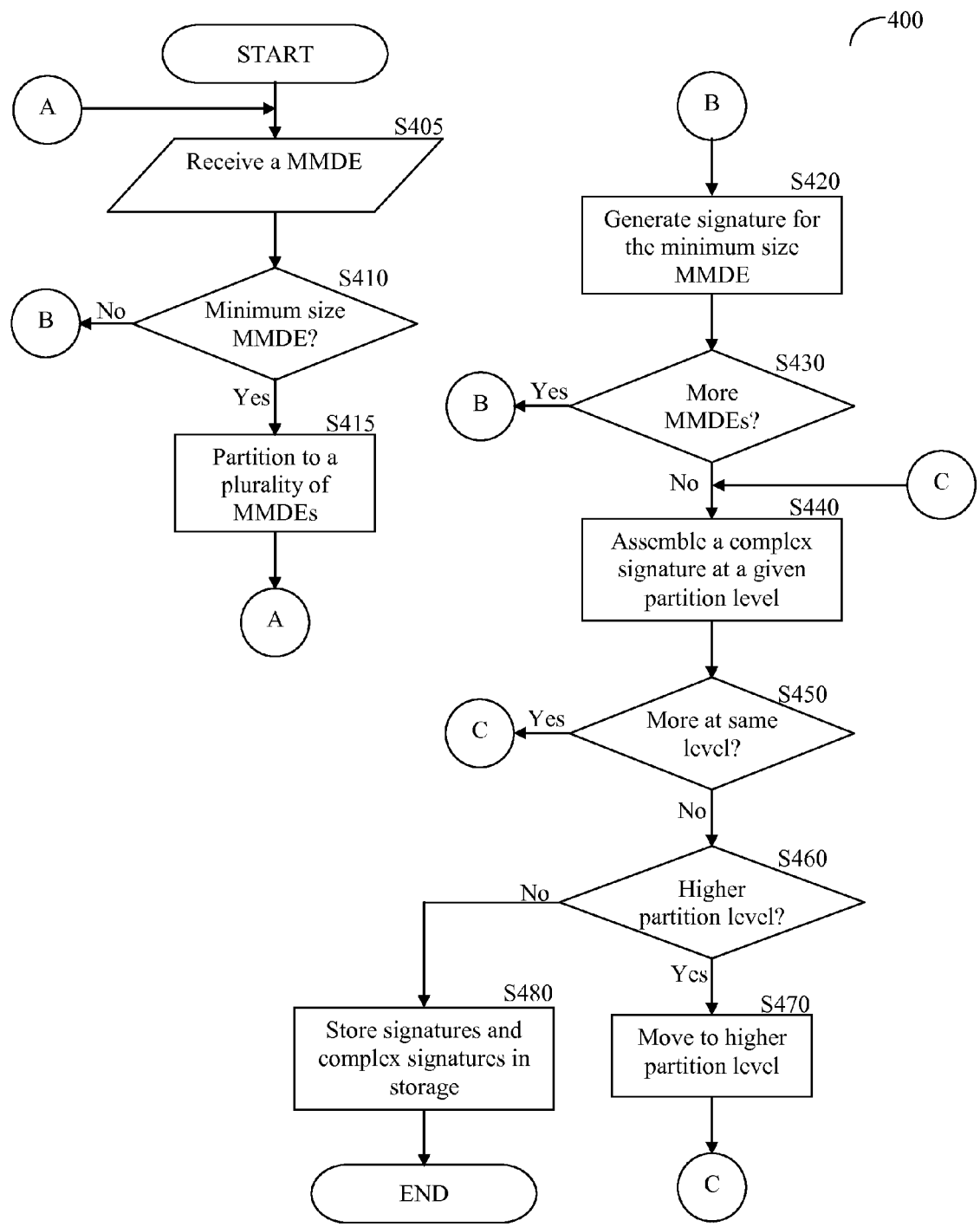
FIG. 4 is a flowchart illustrating a method of generation of complex signatures implemented in accordance with the principles of the invention.

FIG. 4 shows an exemplary and non-limiting flowchart 400 illustrating the method of generation of a complex signature implemented in accordance with the principles of the invention. In S405, a multimedia data element is received, for example, from storage of The System. In S410 it is checked if the multimedia data element is of minimum size, and if so execution continues with S420; otherwise, execution continues with S415 where the received multimedia data element is partitioned to smaller multimedia data elements and the smaller partitions, for example, are stored in the storage, and execution continues with S405. In S420, a signature is generated for the minimum size multimedia data element of the received multimedia data element, and the portions thereof. The signature may be generated as explained hereinabove and/or by other signature generation means that provide a signature respective of the multimedia data element. In S430, it is checked as to whether additional multimedia data elements are present, and if so execution continues with S420; otherwise, execution continues with S440. In S440 complex signatures are assembled for each multimedia data element of a particular partition level, each complex signature comprising a plurality of signatures of lower partition level signatures, as shown with respect to FIG. 3 above. In S460, it is checked if there are multimedia data elements of a higher partition level and if not execution continues with S480; otherwise, execution continues with S470 where a higher partition level is sought and then execution continues with S440. In S480 the generated and assembled signatures are all stored in a storage unit, for example, the storage of The System.

Figure 5:
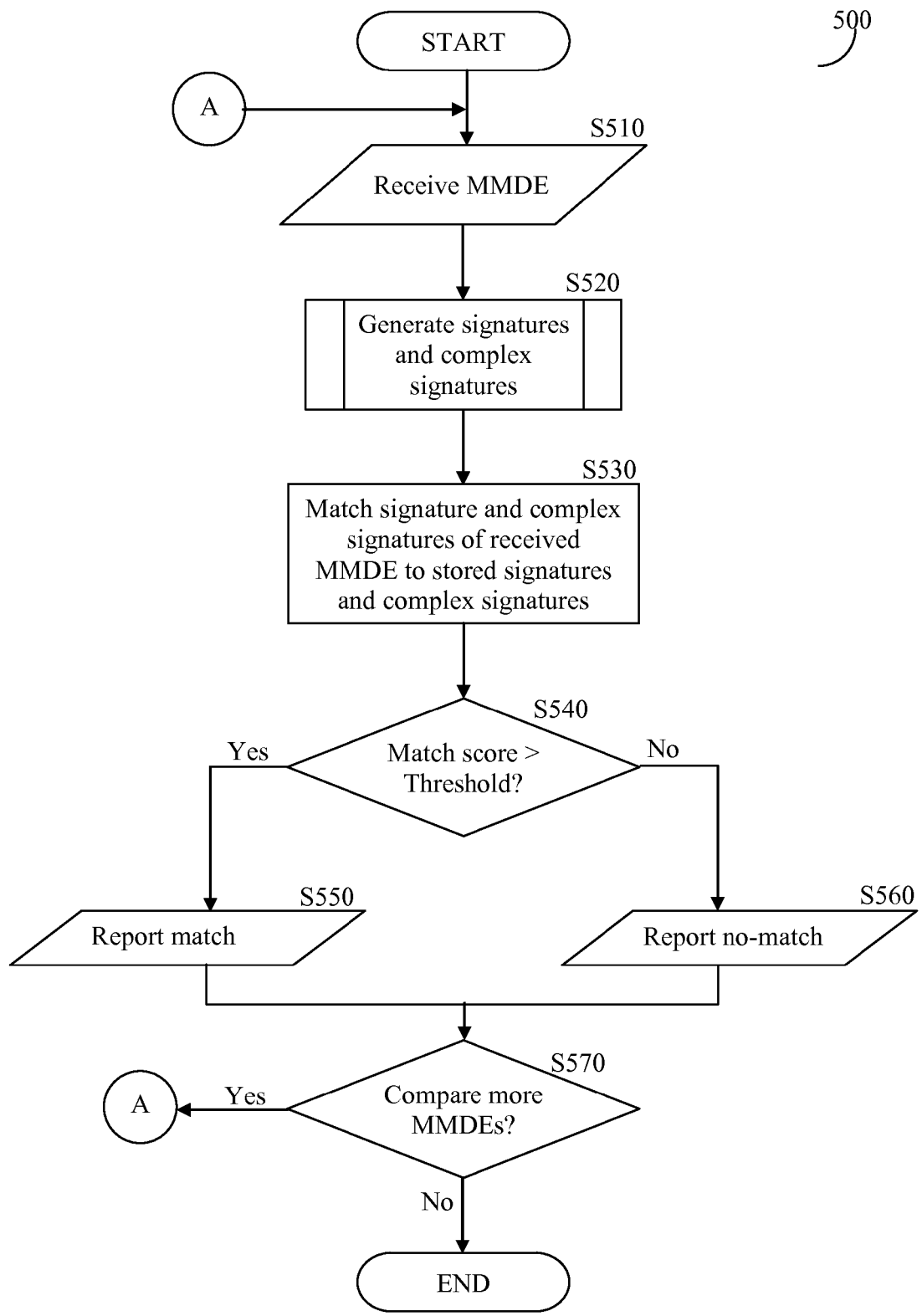
FIG. 5 is a flowchart illustrating a method of a complex signature-based matching performed in accordance with the principles of the invention.

FIG. 5 shows an exemplary and non-limiting flowchart 500 illustrating the method for a complex signatures-based matching implemented in accordance with the principles of the invention. In S510, a multimedia data element is received, for example, by a system that is enabled to perform matching of signatures such as The System, and enabled for the creation of complex signatures as explained hereinabove in greater detail. In S520, a process of generation of at least a complex signature takes place for the received multimedia data element, performed, for example, in accordance with the principles discussed with reference to FIGS. 3 and 4 above. In S530, matching of the complex signature of the received multimedia data element versus complex signatures stored in storage, for example in the storage of The System, takes place. S530 comprises matching of all the signatures generated for the minimum size multimedia data elements. In S540, it is checked if a match score generated based on the signatures and complex signatures is over a predefined matching threshold, and if so execution continues with S550; otherwise, execution continues with S560. In S550 a report of a match found is generated. In S560 a report of no-match found is generated. In S570, it is checked as to whether additional multimedia data elements are to be checked, and if so execution returns to S510; otherwise, execution terminates. It should be noted that the matching at the lowest level may include matching against a plurality of permutations of the minimum size multimedia data element, thereby increasing the chance for correct matching between two multimedia data elements.

Figure 6:
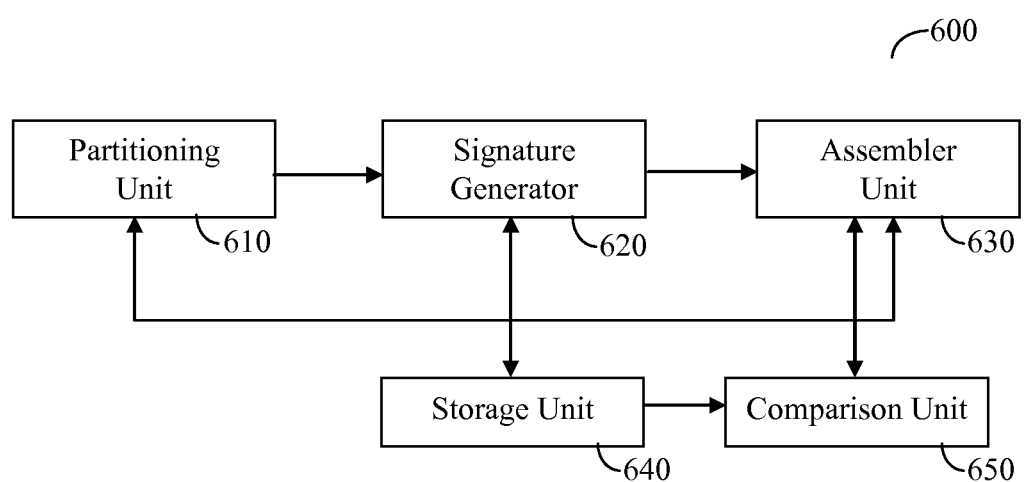
FIG. 6 is a block diagram of a system for generating complex signatures constructed in accordance with the principles of the invention.

A complex signature may be generated by an exemplary and non-limiting system 600 depicted in FIG. 6. The system 600 includes a partitioning unit 610 that receives a multimedia data element and partitions the multimedia data element into small multimedia data elements. At each level of partitioning the partitioned multimedia data elements are checked, and if the partitioned multimedia data element is above a predetermined threshold the partitioning process continues until reaching a level of partitioning where minimum size multimedia data elements are generated. The signature generator 620 coupled to the partitioning unit 610, either directly or via the storage unit 640, generates for each minimum size multimedia data element, a signature. In one embodiment the signature is generated in accordance with signature generation principles explained in more detail herein above. The assembler unit 630 coupled to the signature generator 620 either directly or via the storage unit 640 is enabled to generate complex signatures for each level of partitioning starting from one level above the level of the signatures of the minimum size multimedia data elements. At this level the complex signature of a partitioned multimedia data element comprises a plurality of signatures generated for the minimum size multimedia data elements. At levels higher than that level, the signature of the partitioned multimedia data element, or for that effect, the multimedia data element received by the partitioning unit 610, comprises a plurality of complex signatures assembled from complex signatures of the immediately lower partitioning level. The complex signature and the signatures of the minimum size multimedia elements may be stored in the storage unit 640.

In accordance with another embodiment the system 600 can be utilized to compare input multimedia data elements against stored multimedia data elements. In this embodiment a comparison unit 650 connected to the storage unit 640 and the assembler unit 630 is used to compare the signatures comprising the complex signature of an input multimedia data element to the signatures of at least one stored multimedia data element. The comparison unit 650 further generates a match indication when a match between the input multimedia data element and the stored multimedia data element is found.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. An assembler for generating a complex signature of an input multimedia data element, comprising:
   a first interface for receiving configured to receive a plurality of signatures respective of a plurality of minimum size multimedia data elements, wherein each of the plurality of the minimum size multimedia data elements is a minimal partition of the input multimedia data element, and wherein a signature is generated by from multiple patches of a random length and a random position of the input multimedia data element, wherein the signature is generated by a plurality of independent and random computational cores;
   an assembly unit for combining configured to combine the plurality of signatures respective of the plurality of minimum size multimedia data elements to generate the complex signature; and
   a second interface for storing configured to store at least the complex signature in a storage unit connected thereto.

2. The assembler of claim 1, wherein the second interface is further configured to store the plurality of signatures in the storage unit.

3. The assembler of claim 1, wherein the minimum size multimedia data elements are generated from recursively partitioning an already partitioned multimedia data to smaller size multimedia data elements, until no further partitioning can be reached.

4. The assembler of claim 2, wherein the complex signature corresponds to a higher partition level, wherein the higher partition level comprises a plurality of complex signatures of a lower partition level.

5. The assembler of claim 1, wherein each of the minimum multimedia data elements is associated with signatures respective of at least four angular permutations of the minimum multimedia data element.

6. The assembler of claim 5, wherein the at least four angular permutations include rotation of the minimum multimedia data element by 0 degree, 90 degrees, 180 degrees, and 270 degrees.

7. The assembler of claim 1, wherein the plurality of minimum size multimedia data elements are partitions of a portion of the input multimedia data element.

8. The assembler of claim 1, wherein the input multimedia data element is selected from a group consisting of an image, graphics, a video stream, a video clip, an audio stream, an audio clip, a video frame, a photograph, images of signals, combinations thereof, and portions thereof that are not a minimum size multimedia data element.

9. The assembler of claim 8, wherein the images of signals are images selected from a group consisting of medical signals, geophysical signals, subsonic signals, supersonic signals, electromagnetic signals, and infrared signals.

10. A method for generating a complex signature of an input multimedia data element, comprising:
    receiving a plurality of signatures respective of a plurality of minimum size multimedia data elements, wherein each of the plurality of the minimum size multimedia data elements is a minimal partition of the input multimedia data element, and wherein a signature is generated from multiple patches of a random length and a random position of the input multimedia data element, wherein the signature is generated by a plurality of independent and random computational cores;
    combining the plurality of signatures respective of the plurality of minimum size multimedia data elements to generate the complex signature; and
    storing at least the complex signature in a storage unit connected thereto.

11. The method of claim 10, further comprising: recursively partitioning an already partitioned multimedia data element to smaller size multimedia data elements, until no further partitioning can be reached.

12. The method of claim 11, further comprising:
    storing the plurality of signatures in the storage unit.

13. The method of claim 12, further comprising: generating the complex signature corresponds to a higher partition level, wherein the higher partition level comprises a plurality of complex signatures of a lower partition level.

14. The method of claim 13, wherein each of the minimum multimedia data elements is associated with signatures respective of at least four angular permutations of the minimum multimedia data element.

15. The method of claim 14, wherein the at least four angular permutations include rotation of the element by 0 degree, 90 degrees, 180 degrees, and 270 degrees.

16. The method of claim 10, wherein the plurality of minimum size multimedia data elements is partitioned as a portion of the input multimedia data element.

17. The method of claim 16, wherein the input multimedia data element is selected from the group consisting of an image, graphics, a video stream, a video clip, an audio stream, an audio clip, a video frame, a photograph, images of signals, combinations thereof, and portions thereof that are not a minimum size multimedia data element.

18. The method of claim 17, wherein the images of signals are images selected from the group consisting of medical signals, geophysical signals, subsonic signals, supersonic signals, electromagnetic signals, and infrared signals.

19. The method of claim 10, wherein each of the plurality of signatures includes a first signature and a second signature, wherein the second signature is a robust signature.

20. A non-transitory computer readable medium having stored thereon instructions for causing one or more processing units to execute the method according to claim 10.

* * * * *